US011768713B2

(12) United States Patent
Vishwanath et al.

(10) Patent No.: US 11,768,713 B2
(45) Date of Patent: Sep. 26, 2023

(54) DYNAMIC RELOCATION OF PODS TO OPTIMIZE INTER-POD NETWORKING (71) Applicant: Microsoft Technology Licensing, LLC, Redmond, WA (US)

(72) Inventors: Vidush Vishwanath, Bellevue, WA (US); Kendall Stratton, Phoenix, AZ (US); Rohit Raina, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 273 days.

(21) Appl. No.: 17/234,711

(22) Filed: Apr. 19, 2021

(65) Prior Publication Data
US 2022/0334886 A1 Oct. 20, 2022

(51) Int. Cl.
*G06F 9/50* (2006.01)
*G06F 11/34* (2006.01)

(52) U.S. Cl.
CPC ............ *G06F 9/5083* (2013.01); *G06F 9/505* (2013.01); *G06F 9/5077* (2013.01); *G06F 11/3433* (2013.01); *G06F 2209/503* (2013.01); *G06F 2209/505* (2013.01)

(58) Field of Classification Search
CPC ....... G06F 9/505; G06F 9/5077; G06F 9/5083
See application file for complete search history.

(56) References Cited

U.S. PATENT DOCUMENTS

| 11,025,495 B1* | 6/2021 | Bhatnagar ........... H04L 41/0895 |
| 2014/0115183 A1* | 4/2014 | Mitsunobu ............ H04L 47/621 |
| | | 709/232 |
| 2015/0295849 A1* | 10/2015 | Xia ........................ H04L 41/40 |
| | | 370/235 |
| 2019/0102226 A1 | 4/2019 | Galdato et al. |

(Continued)

FOREIGN PATENT DOCUMENTS

| CN | 110780998 A | 2/2020 |
| CN | 111162941 A | 5/2020 |
| WO | 2019068031 A1 | 4/2019 |

OTHER PUBLICATIONS

"Configure MTU to Maximize Network Performance", Retrieved From: https://web.archive.org/web/20200811135204/https:/docs.projectcalico.org/networking/mtu, Aug. 11, 2020, 5 Pages.

(Continued)

*Primary Examiner* — Sisley N Kim
(74) *Attorney, Agent, or Firm* — Barta, Jones & Foley, PLLC (57) ABSTRACT

Systems and methods for dynamically relocating pods to optimize inter-pod networking efficiency are provided. The method comprises receiving and storing inter-pod traffic data for a plurality of pods. The plurality of pods includes a first pod, a second pod, and a third pod. The method further includes receiving and storing node resource availability data for each node of a plurality of nodes, generating a queue that sorts the plurality of pods by an amount of inter-pod traffic indicated by the inter-pod traffic data, generating a hash that maps one or more parameters to the plurality of (Continued)

nodes, selecting, based on the generated hash, a node of the plurality of nodes, and dynamically relocating a highest ranked pod of the plurality of pods from the generated queue to the selected node.

20 Claims, 5 Drawing Sheets

(56) References Cited

U.S. PATENT DOCUMENTS

| | | |
|---|---|---|
| 2019/0288915 A1 | 9/2019 | Denyer et al. |
| 2020/0162388 A1* | 5/2020 | Lam .................... H04L 67/1023 |
| 2021/0365290 A1* | 11/2021 | Zhang .................... G06F 9/5005 |

OTHER PUBLICATIONS

Chunikhin, Oleg, "Implementing Advanced Scheduling Techniques with Kubernetes", Retrieved From: https://kublr.com/blog/implementing-advanced-scheduling-techniques-with-kubernetes/, Apr. 18, 2018, 8 Pages.

Goltsman, Kirill, "Learn How to Assign Pods to Nodes in Kubernetes Using nodeSelector and Affinity Features", Retrieved From: https://medium.com/kubernetes-tutorials/learn-how-to-assign-pods-to-nodes-in-kubernetes-using-nodeselector-and-affinity-features-e62c437f3cf8, Feb. 21, 2019, 19 Pages.

"International Search Report and Written Opinion Issued in PCT Application No. PCT/US22/022972", dated Jun. 24, 2022, 16 Pages.

Sabharwal, et al., "Introduction to GKE", In Book of Pro Google Kubernetes Engine, Nov. 8, 2020, 23 Pages.

* cited by examiner

DYNAMIC RELOCATION OF PODS TO OPTIMIZE INTER-POD NETWORKING

BACKGROUND

Pod to pod communication in clusters traditionally follows a path involving hops between numerous networking components and devices. The number of hops is increased when pods that communicate with each other are located on different nodes, which in-turn results in extra uses of encapsulation or network address translating. Because these operations consume central processing unit (CPU) resources, memory resources, and networking resources on nodes across the cluster, these operations quickly contribute to a bottle neck when scaling applications that rely on several connections. Current container orchestrators prioritize the location of pods on different nodes, further exacerbating this problem.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Examples and implementations disclosed herein are directed to dynamically relocating pods to optimize inter-pod networking efficiency. Inter-pod traffic data for a plurality of pods is received and stored. The plurality of pods includes a first pod, a second pod, and a third pod, and the inter-pod traffic data includes traffic data sent from the first pod to the second pod and the third pod, from the second pod to the first pod and the third pod, and from the third pod to the first pod and the second pod. Node resource availability data for each node of a plurality of nodes is received and stored. A queue that sorts the plurality of pods by an amount of inter-pod traffic indicated by the inter-pod traffic data is generated. A hash that maps one or more parameters to the plurality of nodes is generated. A node of the plurality of nodes is selected based on the generated hash and a highest ranked pod of the plurality of pods from the generated queue is dynamically relocated to the selected node of the plurality of nodes.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

As referenced herein, direct server return (DSR) is a mechanism to distribute network loads. In DSR, packets bypass a load balancer on a return path. Consider an example where a node includes a first pod and a second pod, and a packet is transmitted from the first pod to the second pod. In a non-DSR system, the packet is transmitted from the first pod to the virtual machine switch. The path is encapsulated to the host IP, sent to the ROOT namespace, sent to the load balancer, and then forwarded to the second pod. The return path is the opposite path. In contrast, in a DSR system, the packet goes from the first pod to the virtual machine switch and then load balances directly to the second pod. In other words, the encapsulation step is skipped and the packet "hops" the ROOT namespace. The return path is directly from the second pod to the first pod. Accordingly, by implementing DSR, latency is reduced because fewer hops and encapsulations are necessary. In addition, DSR enables higher scalability because fewer ports are required. Therefore, various examples of the present disclosure leverage DSR to optimize container networking by monitoring and addressing inter-pod connectivity. The benefits of DSR are particularly visible in instances where pods that communicate with each other more frequently are co-located. However, examples of the present disclosure are not limited to instances were pods in frequent communication are co-located. For example, the dynamic relocation of pods described herein applies to geographically distributed clusters or clusters with nodes in different datacenters.

As described herein, container orchestrators provide static pod allocations to a particular node. Due to standard Kubernetes requirements, if two pods are scheduled, the pods are automatically allocated to two different nodes in order to allow more resources per pod. However, this solution is inefficient and increases latency of the system by utilizing more nodes than may be necessary. While manual configuration can, in some instances, be attempted by a user, the manual allocations are not dynamic, creating downtime. Furthermore, manual configuration is not based on network traffic or current node resources and therefore fails to address latency and resource allocation challenges. Accordingly, both manual configuration and standard Kubernetes procedures fail to overcome the deficiencies of static pod allocations performed by current solutions.

Various examples of the present disclosure address the above-identified challenges by dynamically relocating pods in an optimal fashion according to three dimensions: inter-pod traffic, pod resource consumption, and node resource availability. This methodology is implemented to optimize clusters that would benefit from collocating pods that communicate heavily with each other, such as clusters that use Direct Server Return, or clusters in which node to node latency is significant, such as clusters with globally distributed nodes. The use of this method reduces communication latency between pods and when coupled with Direct Server Return, the reservation of fewer ports on the host. The examples provided herein utilize the DSR scalability without manual determinations of which node to allocate to which host, which reduces the time, energy, and resource requirements of current solutions while eliminating the possibility of human error. In addition, pods backing services can be dynamically allocated with reduced or zero downtime on a host for certain time periods in an effort to optimize inter-service communication. In the example of hypothetical services A, B, and C, examples of the present disclosure enable dynamic allocation of pods such that if communication between service A and service C are higher during morning hours and service A and service B are higher during evening hours, inter-service communication is optimized despite lack of resources to run all pods on the same host. Therefore, various examples of the present disclosure provide a solution to better utilize the capacity of each individual node. By utilizing the capacity of each individual node, network latency in pod-to-pod communication is visibly decreased and scalability of the cluster is significantly higher due to requiring fewer ports on host machines for pods with greater communication.

Aspects of the present disclosure provide a computerized method and system for dynamic relocation of pods to optimize the cluster's inter-pod networking efficiency. The computerized method includes receiving network traffic information between multiple pods, for example between a first pod and a second pod and between the first pod and a third pod. A queue is generated to sort the received network traffic data, by decreasing traffic. Parameters such as average CPU used, average memory used, average disk space used, and average network bandwidth are used to calculate resource usage per pod and resource availability per node. A data structure that maps each maximum parameter to a node is generated and, based on the data structure, a node is selected. At least one of the pods can then be dynamically relocated to the selected node.

Accordingly, the system provided in the present disclosure operates in an unconventional manner by identifying network traffic in real-time, establishing optimization thresholds related to resource availability and usage, confirming that relocation of the pods on a node will not exceed the optimization thresholds, and dynamically relocating the pods on the node in order to optimize the inter-pod networking efficiency.

As referenced herein, a pod includes a unit of one or more containers. A pod is the smallest deployable unit of computing that can be created and managed in Kubernetes systems. Pods are co-located and provide access to the same resources. A pod can include one container or more than one container. In examples where the pod includes more than one container, each of the containers are understood to be co-located on the same node. As referenced herein, a node is a virtual machine or a physical machine that is the target for running or executing pods. As referenced herein, a cluster is a cluster of nodes. The cluster includes a master node, referred to herein as a master, to schedule pods on one or more worker nodes. As referenced herein, various examples are implemented in Kubernetes-based system. The Kubernetes-based system can include the nodes, pods, and so forth to deploy various applications.

Figure 1:
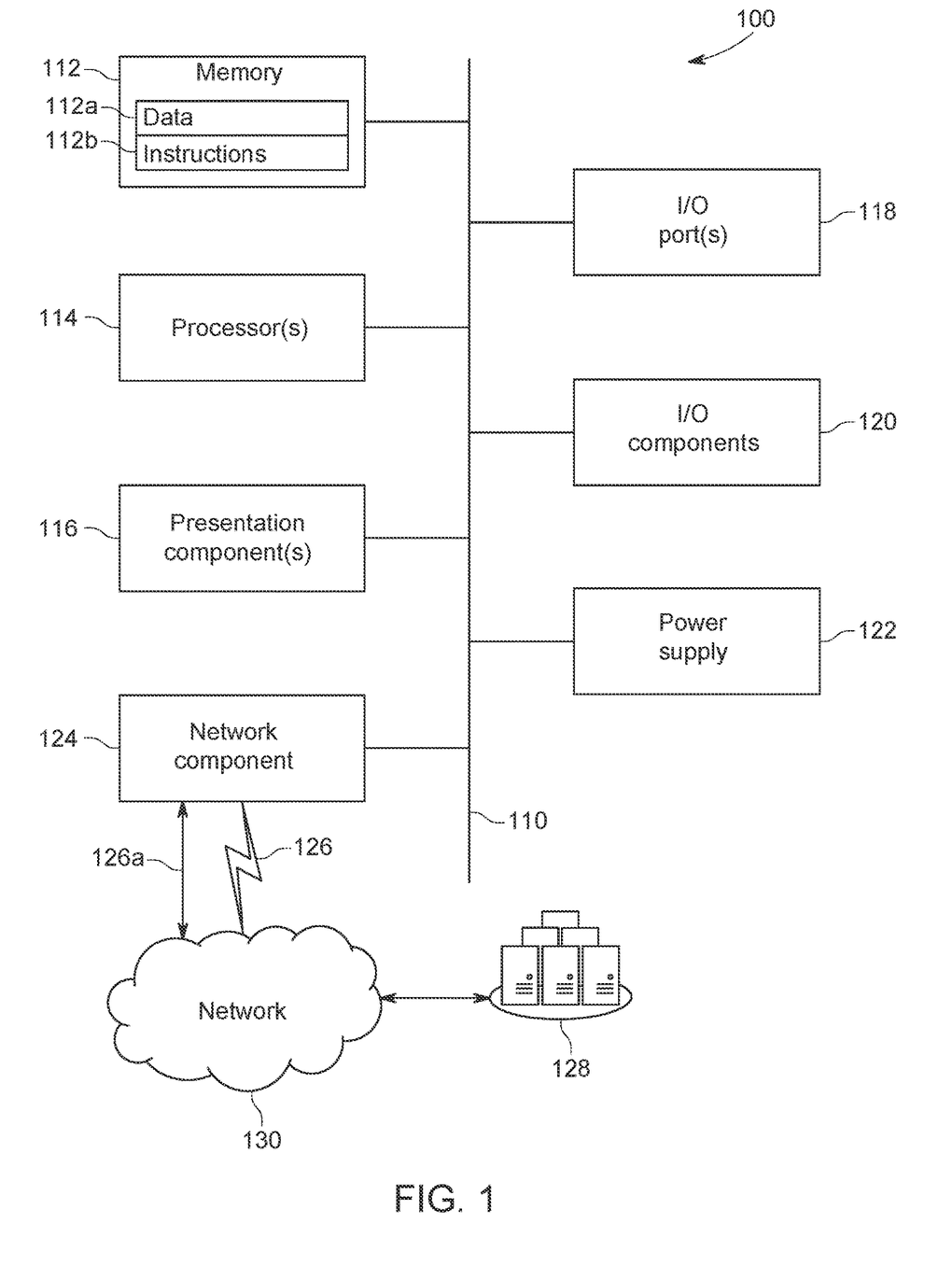
FIG. 1 illustrates a block diagram of an example computing device for implementing various examples of the present disclosure.

FIG. 1 is a block diagram of an example computing device 100 for implementing aspects disclosed herein and is designated generally as computing device 100. Computing device 100 is but one example of a suitable computing environment and is not intended to suggest any limitation as to the scope of use or functionality of the examples disclosed herein. Neither should computing device 100 be interpreted as having any dependency or requirement relating to any one or combination of components/modules illustrated.

The examples disclosed herein may be described in the general context of computer code or machine- or computer-executable instructions, such as program components, being executed by a computer or other machine. Generally, program components include routines, programs, objects, components, data structures, and the like that refer to code, performs particular tasks, or implement particular abstract data types. The disclosed examples may be practiced in a variety of system configurations, including servers, personal computers, laptops, smart phones, servers, VMs, mobile tablets, hand-held devices, consumer electronics, specialty computing devices, etc. The disclosed examples may also be practiced in distributed computing environments when tasks are performed by remote-processing devices that are linked through a communications network.

The computing device 100 includes a bus 110 that directly or indirectly couples the following devices: computer-storage memory 112, one or more processors 114, one or more presentation components 116, I/O ports 118, I/O components 120, a power supply 122, and a network component 124. While the computing device 100 is depicted as a seemingly single device, multiple computing devices 100 may work together and share the depicted device resources. For example, memory 112 is distributed across multiple devices, and processor(s) 114 is housed with different devices. Bus 110 represents what may be one or more busses (such as an address bus, data bus, or a combination thereof). Although the various blocks of FIG. 1 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 1 and the references herein to a "computing device."

Memory 112 may take the form of the computer-storage memory device referenced below and operatively provide storage of computer-readable instructions, data structures, program modules and other data for the computing device 100. In some examples, memory 112 stores one or more of an operating system (OS), a universal application platform, or other program modules and program data. Memory 112 is thus able to store and access data 112a and instructions 112b that are executable by processor 114 and configured to carry out the various operations disclosed herein. In some examples, memory 112 stores executable computer instructions for an OS and various software applications. The OS may be any OS designed to the control the functionality of the computing device 100, including, for example but without limitation: WINDOWS® developed by the MICROSOFT CORPORATION®, MAC OS® developed by APPLE, INC.® of Cupertino, Calif., ANDROID™ developed by GOOGLE, INC.® of Mountain View, Calif., open-source LINUX®, and the like.

By way of example and not limitation, computer readable media comprise computer-storage memory devices and communication media. Computer-storage memory devices may include volatile, nonvolatile, removable, non-removable, or other memory implemented in any method or technology for storage of information such as computer-readable instructions, data structures, program modules, or the like. Computer-storage memory devices are tangible and mutually exclusive to communication media. Computer-storage memory devices are implemented in hardware and exclude carrier waves and propagated signals. Computer-storage memory devices for purposes of this disclosure are not signals per se. Example computer-storage memory devices include hard disks, flash drives, solid state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number an organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device, CPU, GPU, ASIC, system on chip (SoC), or the like for provisioning new VMs when configured to execute the instructions described herein.

Processor(s) 114 may include any quantity of processing units that read data from various entities, such as memory 112 or I/O components 120. Specifically, processor(s) 114 are programmed to execute computer-executable instructions for implementing aspects of the disclosure. The instructions may be performed by the processor, by multiple processors within the computing device 100, or by a processor external to the client computing device 100. In some examples, the processor(s) 114 are programmed to execute instructions such as those illustrated in the flow charts discussed below and depicted in the accompanying figures. Moreover, in some examples, the processor(s) 114 represent an implementation of analog techniques to perform the operations described herein. For example, the operations are performed by an analog client computing device 100 and/or a digital client computing device 100.

Presentation component(s) 116 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 100, across a wired connection, or in other ways. I/O ports 118 allow computing device 100 to be logically coupled to other devices including I/O components 120, some of which may be built in. Example I/O components 120 include, for example but without limitation, a microphone, joystick, game pad, satellite dish, scanner, printer, wireless device, etc.

The computing device 100 may communicate over a network 130 via network component 124 using logical connections to one or more remote computers. In some examples, the network component 124 includes a network interface card and/or computer-executable instructions (e.g., a driver) for operating the network interface card. Communication between the computing device 100 and other devices may occur using any protocol or mechanism over any wired or wireless connection. In some examples, network component 124 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 124 communicates over wireless communication link 126 and/or a wired communication link 126a across network 130 to a cloud environment 128, such as the cloud-computing environment 500 depicted in FIG. 5. Various different examples of communication links 126 and 126a include a wireless connection, a wired connection, and/or a dedicated link, and in some examples, at least a portion is routed through the Internet.

The network 130 may include any computer network or combination thereof. Examples of computer networks configurable to operate as network 130 include, without limitation, a wireless network; landline; cable line; digital subscriber line (DSL): fiber-optic line; cellular network (e.g., 3G, 4G, 5G, etc.); local area network (LAN); wide area network (WAN); metropolitan area network (MAN); or the like. The network 130 is not limited, however, to connections coupling separate computer units. Rather, the network 130 may also include subsystems that transfer data between servers or computing devices. For example, the network 130 may also include a point-to-point connection, the Internet, an Ethernet, an electrical bus, a neural network, or other internal system. Such networking architectures are well known and need not be discussed at depth herein.

As described herein, the computing device 100 can be implemented as one or more servers 100. The one or more servers 100 can be implemented in a cloud-computing environment such as the cloud-computing environment 500 illustrated in FIG. 5. In some examples, the memory 112 stores data 112a, such as traffic data between pods 551, 552, 553 in the cloud-computing environment 500. The processor 114 generates a queue that sorts the stored traffic data 112a, generates a hash that maps one or more parameters to a plurality of nodes 532, 534, selects a node 532 based on the generated hash to which one or more of the pods 551, 552, 553 is to be relocated, and dynamically relocates one or more of the pods 551, 552, 553 to the selected node 532.

As described herein, various examples of the present disclosure optimize container networking by monitoring and addressing inter-pod connectivity and, accordingly, dynamically relocating pods to optimize inter-pod networking efficiency. Measuring inter-pod connectivity includes monitoring and collecting outgoing traffic between pods. In some examples, traffic data for a particular pod is received by the computing device 100 and stored in a table, such as Table 1. The traffic data is evaluated and reevaluated at intervals that can be determined automatically or set by a user. In some examples, a timer is used to track the interval and each time the timer reaches the interval, traffic data and corresponding pod allocation is reevaluated.

Traffic data is collected by each particular pod. In other words, a hash is maintained that maps the name of the pod to the amount of outgoing data since the most recent reevaluation time. In some examples, the hash is maintained at the pod level. In some examples, the hash is maintained at the node level. Table 1 is an example of the hash maintained for Pod 1 for a particular interval.

TABLE 1

| Pod Name | Outgoing traffic transmitted since last re-evaluation. |
| --- | --- |
| Pod 2 | 44 MB |
| Pod 3 | 4 GB |
| Pod n | 4 MB |

As shown herein, Table 1 illustrates that 44 MB of outgoing traffic has been transmitted to Pod 2 since the previous reevaluation, 4 GB of outgoing traffic has been transmitted to Pod 3 since the previous reevaluation, and 4 MB of outgoing traffic has been transmitted to Pod n since the previous reevaluation. The number of pods that are monitored and analyzed is not limited to three and can comprise any suitable number of pods, as denoted by Pod n. The traffic data is maintained by each particular pod in the hash and reported to the master at the interval designated by the timer. In various examples, the master can be a single master node or multiple master nodes. Although the hash for only Pod 1 is provided herein, it should be understood that each individual pod maintains a separate hash for outgoing traffic. For example, Pod 2 also maintains a hash that identifies the amount of outgoing traffic to Pod 1, Pod 3, and Pod n, Pod 3 also maintains a hash that identifies the amount of outgoing traffic to Pod 1, Pod 2, and Pod n, and so forth.

As the master receives the hash data from each pod, the master generates a master priority queue using the received hash data from each queue. The master priority queue sorts pod interaction by the amount of inter-pod traffic. In some examples, the master priority queue sorts pod interaction by decreasing inter-pod traffic, i.e., the greatest inter-pod traffic is presented first, as illustrated in Table 2. Table 2 is an example of a master priority queue generated by a master node. As presented in Table 2, inter-pod traffic from Pod 1 to Pod 3 is 4 GB, inter-pod traffic from Pod 3 to 1 is 2 GB, inter-pod traffic from Pod 1 to Pod 2 is 44 GB, and inter-pod traffic from Pod n to Pod m is 6 GB. Accordingly, the master priority queue presented in Table 2 is sorted from greatest inter-pod traffic to least inter-pod traffic. It should be noted that Table 2 includes some of the hash data received from Pod 1 that is presented in Table 1. For example, Table 1 indicates that 4 GB of outgoing traffic data is transmitted from Pod 1 to Pod 3 during the interval and Table 2 identifies the 4 GB of outgoing traffic data from Pod 1 to Pod 3 as the greatest amount of inter-pod traffic during the interval.

TABLE 2

| Source Pod | Destination Pod | Inter-pod Traffic |
| --- | --- | --- |
| Pod 1 | Pod 3 | 4 GB |
| Pod 3 | Pod 1 | 2 GB |
| Pod 1 | Pod 2 | 44 MB |
| Pod n | Pod m | 6 MB |

In some examples, the master node identifies the capacity of various nodes and the usage of various pods. The identified pod usage generates new parameters identified as CPU average time (CPUMeasurementInterval), memory average time (MemoryMeasurementInterval), disk average time (DiskMeasurementInterval), and network average time (NetworkBandwidthMeasurementInterval). These parameters provide a time interval after which a usage measurement is taken. For example, if CPUMeasurementInterval is 60 seconds, a CPU Usage measurement for Table 3 and a CPU Availability measurement for Table 4 will be taken every 60 seconds. CPUMeasurementInterval measures the average CPU usage for a pod or node over time. For example, a data point can get used at a particular interval, such as every sixty seconds, and then averaged to generate the CPUMeasurementInterval. MemoryMeasurementInterval measures the average memory, such as RAM, ROM, etc. usage for a pod or node over time, such as every sixty seconds. DiskMeasurementInterval measures the average disk, such as hard disk, usage for a pod over time, such as every sixty seconds. NetworkBandwidthMeasurementInterval measures the average network usage for a pod or node over time, such as every sixty seconds. Network usage can be calculated over Mb/s.

As described herein, the parameters CPUMeasurementInterval, MemoryMeasurementInterval, DiskMeasurementInterval, and NetworkBandwidthMeasurementInterval are used to measure resource usage per pod, as illustrated in Table 3 below, and resource availability per node, as illustrated in Table 4 below. For example, Table 3 illustrates the resource availability per node, such as Pod 1 and Pod 2. More particularly, Table 3 provides data fields for CPU usage, memory usage, disk usage, and network usage for Pod 1 and Pod 2. Table 4 illustrates the resource availability per node, such as Node 1 and Node 2. More particularly, Table 4 provides data fields for CPU availability, memory availability, disk availability, and network availability for Node 1 and Node 2. The values presented in Table 4 are derived using the same parameters CPUMeasurementInterval, MemoryMeasurementInterval, DiskMeasurementInterval, and NetworkBandwidthMeasurementInterval that are used to derive the values presented in Table 3.

TABLE 3

| Pod | CPU Usage | Memory Usage | Disk Usage | Network Bandwidth Usage |
| --- | --- | --- | --- | --- |
| Pod 1 | 1.1 GHz | 2.1 GB | 5 GB | 1 Mbps |
| Pod 2 | 0.9 GHz | 0.9 GB | 5 GB | 3 Mbps |

TABLE 4

| Node | CPU Availability | Memory Availability | Disk Availability | Network Bandwidth Availability |
| --- | --- | --- | --- | --- |
| Node 1 | 6 GHz | 16 GB | 750 GB | 50 Mbps |
| Node 2 | 4 GHz | 16 GB | 500 GB | 20 Mbpz |

The node capacity and pod usage data is collected and averaged over time. As described herein, the interval used can be a time period such as sixty seconds or another interval, such as thirty seconds, ninety seconds, and so forth. The parameters CPUMeasurementInterval, MemoryMeasurementInterval, DiskMeasurementInterval, and NetworkBandwidthMeasurementInterval can be set to a default formula such as the reevaluation time divided by ten or can be set individually by a user. For example, if the reevaluation time is set to ten minutes and the CPUMeasurementInterval is set to sixty seconds, i.e., one minute, ten data points are taken of CPU availability, one for each minute, and averaged at the conclusion of the ten-minute interval to identify CPU availability. After another sixty seconds, the interval used for CPUMeasurementInterval, the ten most recent data points of CPU availability are taken and averaged to identify an updated CPU availability. This process is performed for each of CPU availability, memory availability, disk availability, and network availability to derive the values presented in Table 4. A similar process is used to identify parameters for pod usage. For example, if the reevaluation time is set to ten minutes and the CPUMeasurementInterval is set to sixty seconds, i.e., one minute, ten data points are taken of CPU usage, one for each minute, and averaged at the end of ten minutes to identify CPU usage. This process is performed for each of CPU usage, memory usage, disk usage, and network usage to derive the values presented in Table 3. In some examples, the reevaluation time is a fifth user-set parameter.

For example, consider Pod 1 and Pod 2, each of which reside on Node 1, have not been relocated, the CPU usage for Pod 1 is 0.5 GHz, and the CPU usage for Pod 2 is 0.5 GHz. Over time, Node 1 has an example average CPU availability of 1 GHz. The average CPU availability of Node 1 is calculated as 2 GHz by adding 0.5 GHz of usage from Pod 1 and 0.5 GHz of usage from Pod 2 to the 1 GHz of average CPU availability, after considering the usage from Pod 1 and Pod 2. In other words, the CPU availability of a particular node measures the availability of the particular node without potentially newly relocated pods running on the node. As described in greater detail below, in a next iteration, Pod 1 can be relocated onto Node 1 while Pod 2 is not relocated, which would give a CPU availability value of 1.5 GHz. 1.5 GHz is calculated by calculating the sum of the average CPU availability, e.g., 1 GHz, and 0.5 GHz from non-relocated Pod 2. Although described herein as an example for calculating CPU availability of a node, the same example can be used to calculate any or all of the values presented in Table 4, including memory availability, disk availability, and network availability.

Based on the values presented in Table 3 and Table 4, the master generates a data structure, illustrated below in Table 5. In some examples, the data structure is a hash that maps each maximum resource available to an element, where the element contains a set of nodes that match the criteria mapped to a value that indicates maximum availability. In other words, the hash identifies the maximum CPU availability, memory availability, disk availability, and network availability and maps the particular node containing the identified maximum availability.

TABLE 5

| Max CPU Availability | Memory Availability | Disk Availability | Network Bandwidth Availability |
|---|---|---|---|
| {Node 1, 3: 6 GHz} | {Node 3: 32 GB} | {Node 5: 1 TB} | {Node 4: 100 Mbps} |

For example, as presented in Table 5, the maximum CPU availability is 6 GHz and each of Node 1 and Node 3 have an average of 6 GHz available. The maximum memory available is 32 GB and Node 3 has 32 GB available. The maximum disk availability is 1 TB and Node 5 has 1 TB available. Node 4 is identified as having the greatest network availability of 100 Mbps.

As shown in Table 5, two nodes, Node 1 and Node 3, each have the maximum CPU availability available. In examples where the maximum availability that is breached has multiple nodes, the selected node for pod relocation is the node that is presented the most number of times in Table 5. For example, if a maximum parameter that is breached is CPU usage=6 GHz, Node 3 is selected to relocate pods onto because Node 3 appears the maximum number of times, i.e., twice, in Table 5 and therefore has the greatest number of resources available of the nodes.

Table 6 (below) illustrates a dataset containing sets of pods that are destined for rescheduling as well as floats for a current running total of parameter usages. In other words, the datasets in Table 6 identify pods to be relocated to a same node. Table 6 further includes the total usage values of the pods to be relocated. For example, Table 6 identifies a pod set of Pod 1, Pod 2, and Pod 3 that are destined for relocation to the same node based on the data traffic between Pod 1 and Pod 2, Pod 1 and Pod 3, and Pod 2 and Pod 3. As shown in Table 6, the pod set has a total CPU usage of 3.2 GHz, a total memory usage of 5.2 GB, a total disk usage of 12 GB, and a total network usage of 5 Mb/s. The total usage values indicate the total amount of CPU usage, memory usage, and so forth by the pods in the particular pod set to be relocated.

TABLE 6

| Pod Set | CPU Usage | Memory Usage | Disk Usage | Network Bandwidth Usage |
|---|---|---|---|---|
| (Pod 1, Pod 2, Pod 3) | 3.2 GHz | 5.2 GB | 12 GB | 5 Mbps |
| (Pod n, Pod n-1) | 1.1 GHz | 250 MB | 500 MB | 2 Mbps |

The dataset illustrated in Table 6 are identified as follows. Examples of the present disclosure take into account that the master receives data in the form (src pod, dst pod): traffic. In the dataset illustrated in Table 6, the data can be (Pod 1, Pod 2): 50 Mhz and (Pod 2, Pod 3): 25 Mhz. Pod 1 and Pod 2 are added to the same set in Table 6. Then, Pod 3 is added to the same set because the next entry containing Pod 3 overlaps with the set in Table 6 because of Pod 2. In contrast, two different sets would be produced for Table 6 if the data was different, such as (Pod 1, Pod 2): 50 MHz and (Pod 3, Pod 4): 25 MHz.

Table 7 (below) illustrates a data structure that includes rescheduled pods or pods that are scheduled for relocation. The pod set illustrated in Table 7 includes Pod 4 and Pod 5.

TABLE 7

| Pod Set | (Pod 4, Pod 5) |
|---|---|

Figure 2:
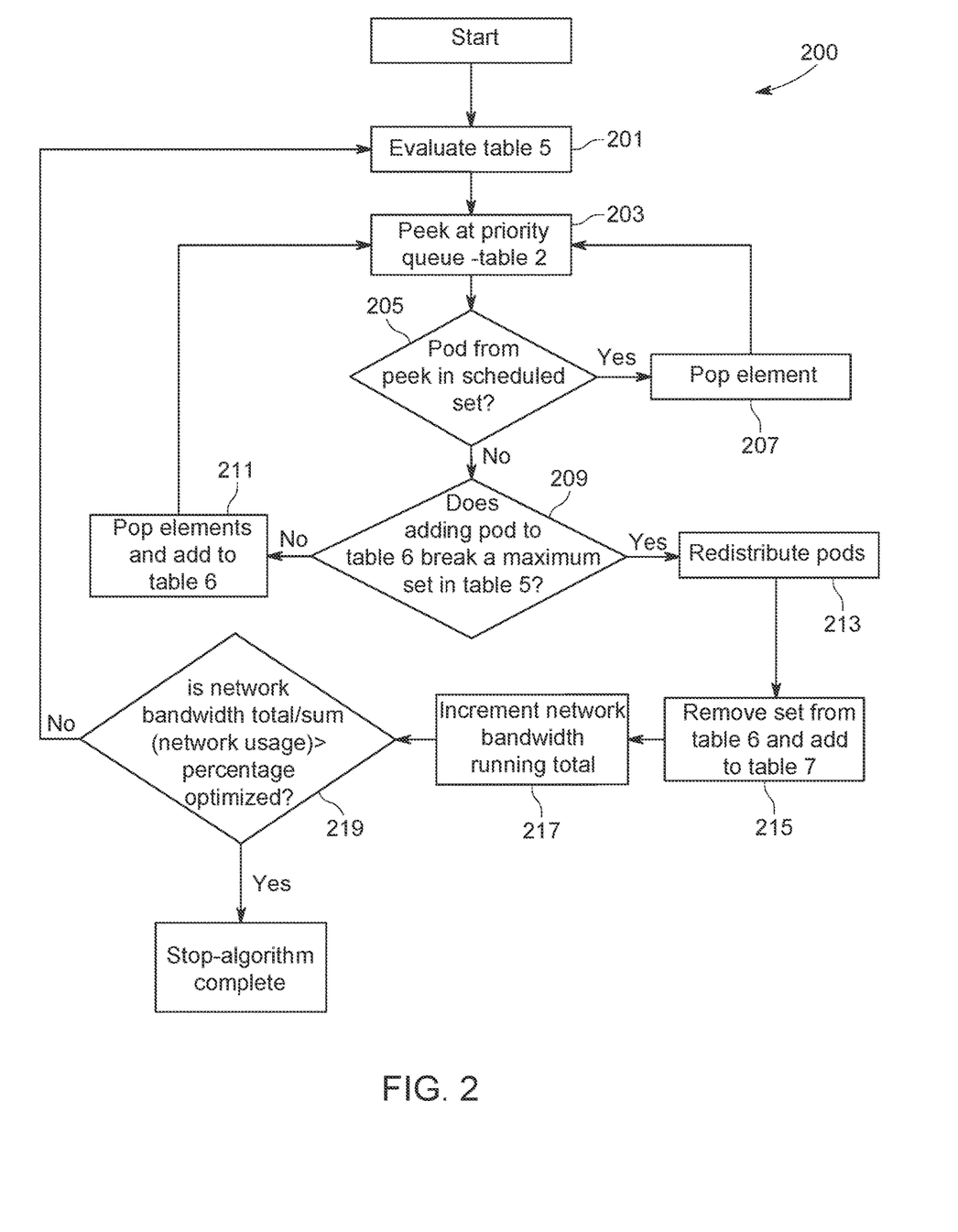
FIG. 2 is a flow chart diagram illustrating operations for rescheduling the flow of pods according to various examples of the present disclosure.

Various examples provided herein present example methods of dynamically relocating pods based on the hash generated and presented in Table 4 and the hash generated and presented in Table 5. For example, FIG. 2 is a flow chart diagram illustrating operations for rescheduling the flow of pods according to various examples of the present disclosure. The operations illustrated in FIG. 2 are for illustration and should not be construed as limiting. Various examples of the operations can be used without departing from the scope of the present disclosure.

The flow chart 200 begins by evaluating Table 5 at operation 201. The data of Table 5, as described herein, identifies the maximum availability of each of four parameters, CPU availability, memory availability, disk availability, and network availability. In some examples, a sixth user set parameter, referred to herein as percentageOptimized, specifies the percentage of network bandwidth that is optimized for before allowing random allocation of pods. In some examples, the percentageOptimized can be set to fifty percent by default. In some examples, the percentageOptimized is set by a user to a percentage other than fifty percentage. In some examples, the percentageOptimized is a sixth user-set parameter.

In operation 203, the master peeks at the elements of the priority queue of Table 2. In some examples, peeking at the elements of the priority queue of Table 2 is the beginning of a while loop. Peeking at the elements of the priority queue of Table 2 is an opportunity to identify whether adding the current pod in Table 6 to a particular node would cause any of the parameters to exceed the maximum value for the node specified in Table 5. In other words, relocating one or more of the pods to a particular node could improperly exceed the maximum threshold for the node, so peeking at the elements of the priority queue provides a check to ensure the capacity of the node is not exceeded. If relocating the pod or pods to the node would exceed the capacity of the node, the relocation is prevented before execution.

By peeking at the elements of the priority queue presented in Table 2, the master identifies whether both pods are present in a scheduled set, such as the scheduled set of Table 7 in operation 205. If at least one of the pods is in the scheduled set of Table 7, the pod has already been placed in the optimal location and therefore will not be relocated. Accordingly, the method progresses to operation 207. If none of the pods are in the scheduled set of Table 7, the method progresses to operation 209.

In operation 207, based on at least one of the pods being in the scheduled set of Table 7, the master pops the element. As discussed herein, popping an element refers to taking the element on the top of the queue, i.e., next in the queue, out of the queue. In other words, the popped top element is removed from the queue. The pod at the top of the queue is identified as the candidate most deserving of dynamic relocation. In some examples, the elements in the priority queue represents a virtual stack of elements. For example, the first row in Table 2 indicates Pod 1-Pod 3—4 GB, the second row in Table 2 indicates Pod 3-Pod 1—2 GB, and so forth. Elements in the virtual stack represented by the Table 2 can be subject to a push of elements and a pop of elements in the stack. The elements on the top of the virtual stack, shown in Table 2 as Pod 1-Pod 3—4 GB, can be popped off of the top while elements below the top of the virtual stack can be pushed up, either due to an above element being popped off or due to an increase of inter-pod traffic that pushes the elements higher in the virtual stack. Based on the master popping the element in operation 207, the master returns to operation 203 and peeks at the next element in the priority queue indicated by Table 2, which is now the top element based on the previously top element having been popped off.

In operation 209, based on none of the pods being in the scheduled set of Table 7, the master determines whether relocating the pod or pods to the data structure represented by Table 6 would break any one of the maximum thresholds that are set in the data structure represented by Table 5.

For example, Table 5 identifies that each of Node 1 and Node 3 have 6 GHz of CPU available, and that 6 GHz is the maximum CPU availability of any the worker nodes. The set of pods identified in Table 6 is compared to the maximum to ensure that relocating the pods of Table 6 to the identified nodes identified in Table 5 does not exceed the maximum capacity. In the example of Table 6, the pod set including Pod 1, Pod 2, Pod 3 has a CPU usage of 3.2 GHz. The usage of 3.2 GHz does not exceed the maximum capacity of Node 1 and Node 3, each of which have the capacity of 6 GHz. As another example, the maximum memory availability is 32 GB on Node 3 and the memory usage of Pod 1, Pod 2, Pod 3 is 5.2 GB, which does not exceed 32 GB. The maximum disk availability is 1 TB on Node 5 and the disk usage of Pod 1, Pod 2, Pod 3 is 12 GB.

Based on determining that relocating the pods to the selected node does not exceed the maximum identified in Table 5, in operation 211 the master pops the elements as described herein and adds the elements to Table 6. In other words, if a maximum threshold for any resource availability would be exceeded by relocation, the pods are not eligible to be dynamically relocated to the selected node. More specifically, a maximum threshold for each resource of CPU availability, memory availability, disk availability, and network availability for the selected cannot be reached for the pod or pods to be relocated to the selected node. After popping the element in operation 211, the master returns to operation 203 and again peeks at the element or elements now at the top of the priority queue in operation 203. Accordingly, operations 203-209 continue until, at operation 209, it is determined that relocating the pods to the data structure in Table 6 would exceed the maximum capacity identified in Table 5. Then, in operation 213, the pods are redistributed to a node as described in greater detail below with regard to FIG. 3. For example, a new node is selected, or scheduled, for the pod or pods to be dynamically relocated to. The selected node matches the maximum parameters identified in operation 211. In some examples, there are multiple nodes that match the maximum parameters. In this example, various methods can be used to select a particular node. For example, the node that is present most often in Table 1 and matches the maximum parameter from operation 211 can be selected.

In operation 215, the master removes the set of pods from Table 6 and adds the set of pods to Table 7. As described herein, Table 7 identifies pods that are scheduled for relocation or have been relocated. In operation 217, the master increments the network bandwidth total. Incrementing the network bandwidth total refers to the process of reevaluating the network bandwidth with regard to the rescheduled pods. Each time pods are dynamically redistributed to a node, the network bandwidth is updated accordingly. After the increment network bandwidth running total is incremented in operation 217, in operation 219 the master identifies whether the network bandwidth total divided by all network usage, i.e., sum(networkUsage), is greater than the percentageOptimized. The network bandwidth running total is incremented by the number equal to "Network Usage" of the pod set that was relocated from Table 6. As described herein, percentageOptimized is the sixth user parameter that specifies the percentage of network bandwidth that is optimized for before allowing random allocation of pods.

Based on the network bandwidth total divided by the total network usage being less than percentageOptimized in operation 219, the master returns to operation 201 and evaluates the data of Table 5 in order to dynamically relocate one or more pods to further optimize the network. In contrast, based on the network bandwidth total divided by the total network usage being greater than or equal to the percentageOptimized in operation 219, the master exits the while loop and ends the method identified by the flow chart 200.

Figure 3:
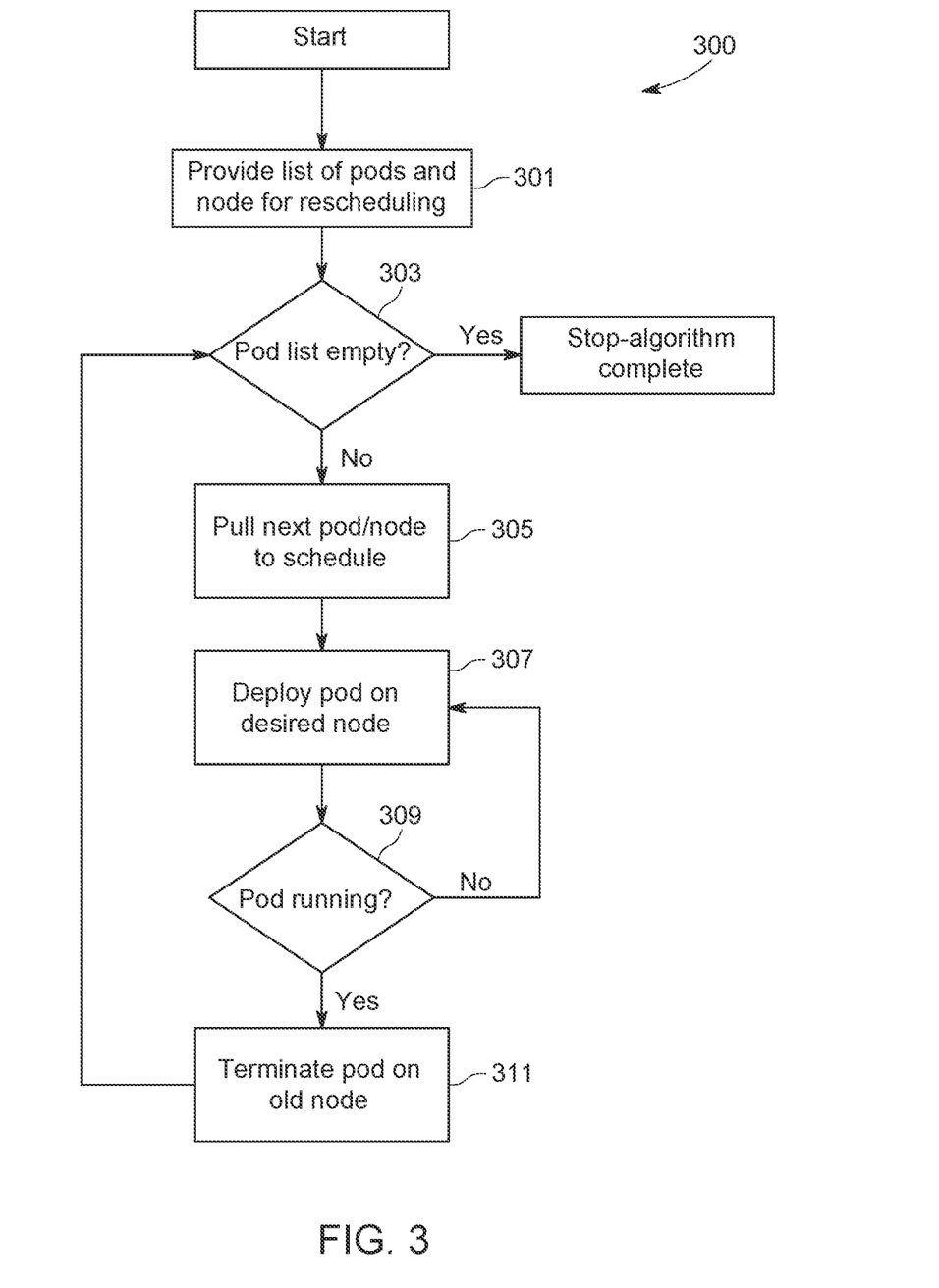
FIG. 3 is a flow chart diagram illustrating operations for redistribution logic according to various examples of the present disclosure.

FIG. 3 is a flow chart diagram illustrating operations for redistribution logic according to various examples of the present disclosure. The operations illustrated in FIG. 3 are for illustration and should not be construed as limiting. Various examples of the operations can be used without departing from the scope of the present disclosure.

As described herein, the flow chart 300 illustrates operation for redistribution, or relocation, of pods as described in operation 213 above. The flow chart 300 begins by the master providing, in operation 301, a list of pods and the node onto which the pods are to be relocated. For example, the master provides the pods and node as {(Pods):Node}, such as {(1,2,3):2}. In operation 303, the master identifies whether the pod list is empty. For example, where the pod identifier does not include any pods for relocation, the pod list is identified as empty and the master exits the operations for redistribution logic. Otherwise, based on the pod list not being empty, the master pulls the next pod and node to schedule in operation 305. Using the example of {(1,2,3):2}, the master pulls the next pod as Pod 1 and the node as Node 2.

In operation 307, the master deploys the identified pod on the identified node. In the example above, Pod 1 is deployed on Node 2. In operation 309, the master waits for the deployed pod to show a status of running. In other words, the master confirms the deployed pod is properly executing on the node. The master waits for a period of time that is predetermined or user-configured based on various examples. Based on the pod not being determined to be running on the node, the master returns to operation 307 and deploys the pod on the node again. Based on the pod being determined to be running on the node, the master terminates the pod on the old node in operation 311. In other words, the deployed pod is, briefly, concurrently executing on the old node and the new node before the pod is terminated in operation 311.

Following the deployed pod being terminated on the old node in operation 311, the master returns to operation 303 and determines whether the pod list is empty. In the example above of {(1,2,3):2}, the pod list would be determined to be {(2,3):2} following the deployment of Pod 1 on Node 2. Based on the pod list being determined to not be empty, in operation 305 {(2):2} is pulled. Operations 305-311 are executed for {(2):2} and the master returns to operation 303. The pod list of {(3):2} is pulled, operations 305-311 are executed for {(3):2}, and the master again returns to operation 303. Once each of Pod 1, Pod 2, and Pod 3 have been deployed to Node 2, the master identifies the pod list is empty in operation 303 and exits the flow chart 300 because the algorithm is complete. In the context of the flow chart 200 illustrated in FIG. 2 above, the set is then removed the data structure of Table 6 and added to the data structure of Table 7 to represent the pods having been rescheduled.

As described herein, dynamically relocating pods can utilize user parameters as presented in Table 8. As shown in Table 8, the user-configured parameters include one or more of a reevaluation time, percentage optimized, CPUMeasurementInterval, MemoryMeasurementInterval, DiskMeasurementInterval, and NetworkBandwidthMeasurementInterval.

TABLE 8

| Reevaluation Time | Percentage Optimized |
|---|---|
| CPUMeasurementInterval | MemoryMeasurementInterval |
| DiskMeasurementInterval | NetworkBandwidthMeasurementInterval |

Figure 4:
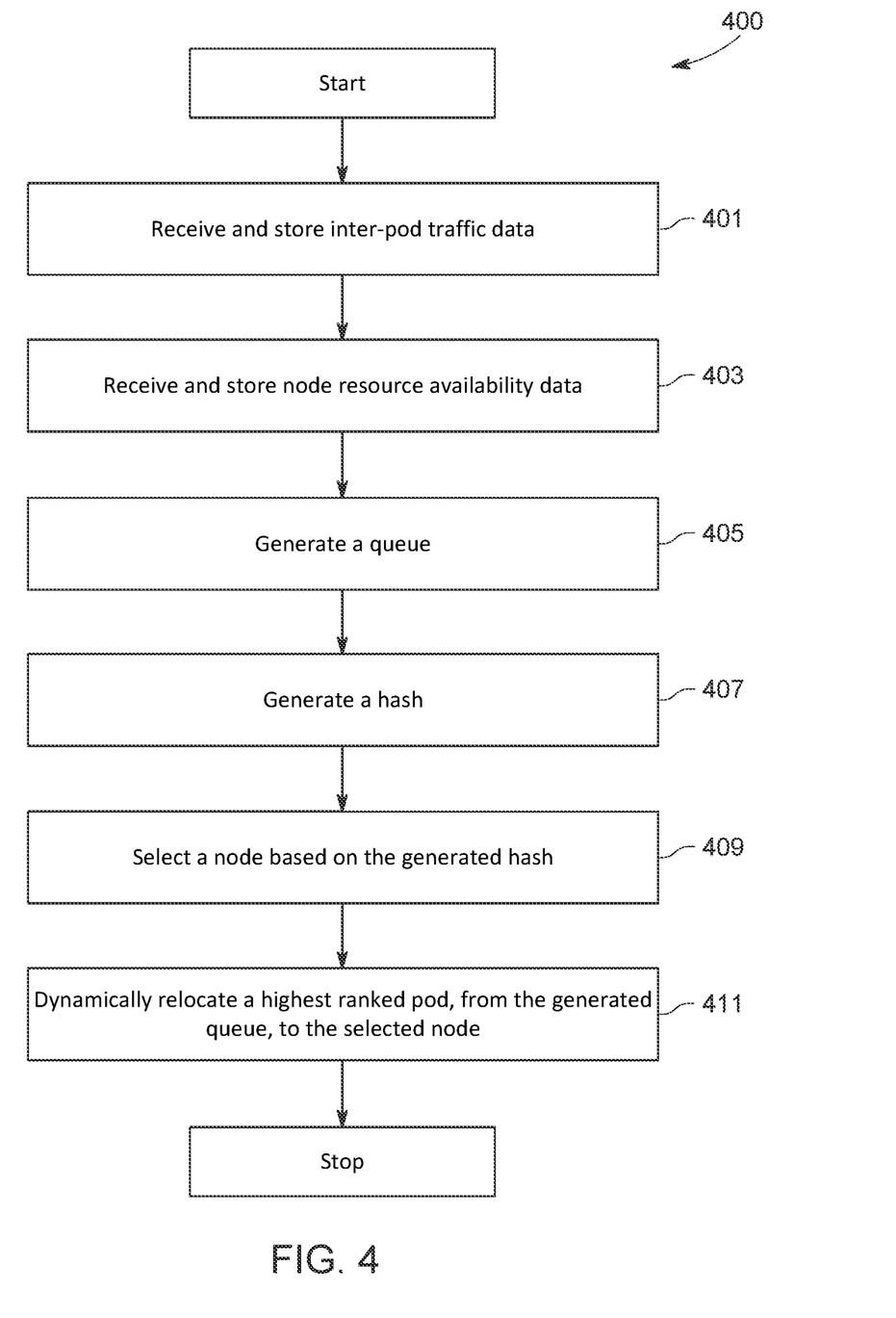
FIG. 4 is a flow chart diagram illustrating operations of a computer-implemented method for dynamically relocating pods to optimize inter-pod networking efficiency according to various examples of the present disclosure.

FIG. 4 is a flow chart diagram illustrating operations of a computer-implemented method for dynamically relocating pods to optimize inter-pod networking efficiency according to various examples of the present disclosure. The operations illustrated in FIG. 4 are for illustration and should not be construed as limiting. Various examples of the operations can be used without departing from the scope of the present disclosure.

The flow chart 400 begins by a master receiving and storing inter-pod traffic data for a plurality of pods in a cluster of nodes in operation 401. For example, as presented in Table 1, 44 MB of outgoing traffic data from a first pod, e.g., Pod 1, to a second pod, e.g., Pod 2, is stored in a memory. The plurality of pods includes at least the first pod, the second pod, and a third pod. However, various examples are possible, and the plurality of pods can include any suitable number of pods without departing from the scope of the present disclosure. The inter-pod traffic data includes traffic data sent from the first pod to the second pod and the third pod, from the second pod to the first pod and the third pod, and from the third pod to the first pod and the second pod. In operation 403, the master receives and stores node resource availability data for each node of a plurality of nodes.

In operation 405, the master generates a queue that sorts the plurality of pods by an amount of inter-pod traffic indicated by the inter-pod traffic data. For example, as presented in Table 2, the inter-pod traffic data is sorted by decreasing inter-pod traffic. In operation 407, the master generates a hash that maps one or more parameters to the plurality of nodes. In some examples, the master calculates resource usage for each pod of the plurality of pods, such as the first pod, the second pod, and the third pod. In some examples, the one or more parameters include a CPU measurement interval, i.e., the CPUMeasurementInterval, a memory measurement interval, i.e., the MemoryMeasurementInterval, a disk measurement interval, i.e., the DiskMeasurementInterval, and a network measurement interval, i.e., the NetworkBandwidthMeasurementInterval. In some examples, the one or more parameters further include a percentage optimized parameter applied to a sum of inter-pod network usage of the pods of the plurality of pods that have been relocated. In some examples, the value for each parameter of the one or more parameters is set by a user. In some examples, the value for each parameter of the one or more parameters default to a default value, such as the reevaulationTime divided by ten as described herein.

In operation 409, the master selects a node of the plurality of nodes based on the generated hash. The selected node is the node to which a highest ranked pod, or pods, from the generated queue is to be dynamically relocated. In some examples, selecting the node includes generating a pod set identified for relocation. The pod set includes the particular pods selected to be relocated to the selected node, such as at least one of the first pod, the second pod, and the third pod. In some examples, the master confirms that relocating the pod set to the selected node maintains a usage value for each parameter of the one or more parameters below a maximum threshold. In operation 411, the master dynamically relocates a highest ranked pod of the plurality of pods from the generated queue to the selected node of the plurality of nodes.

Example Cloud-Computing Environment

Figure 5:
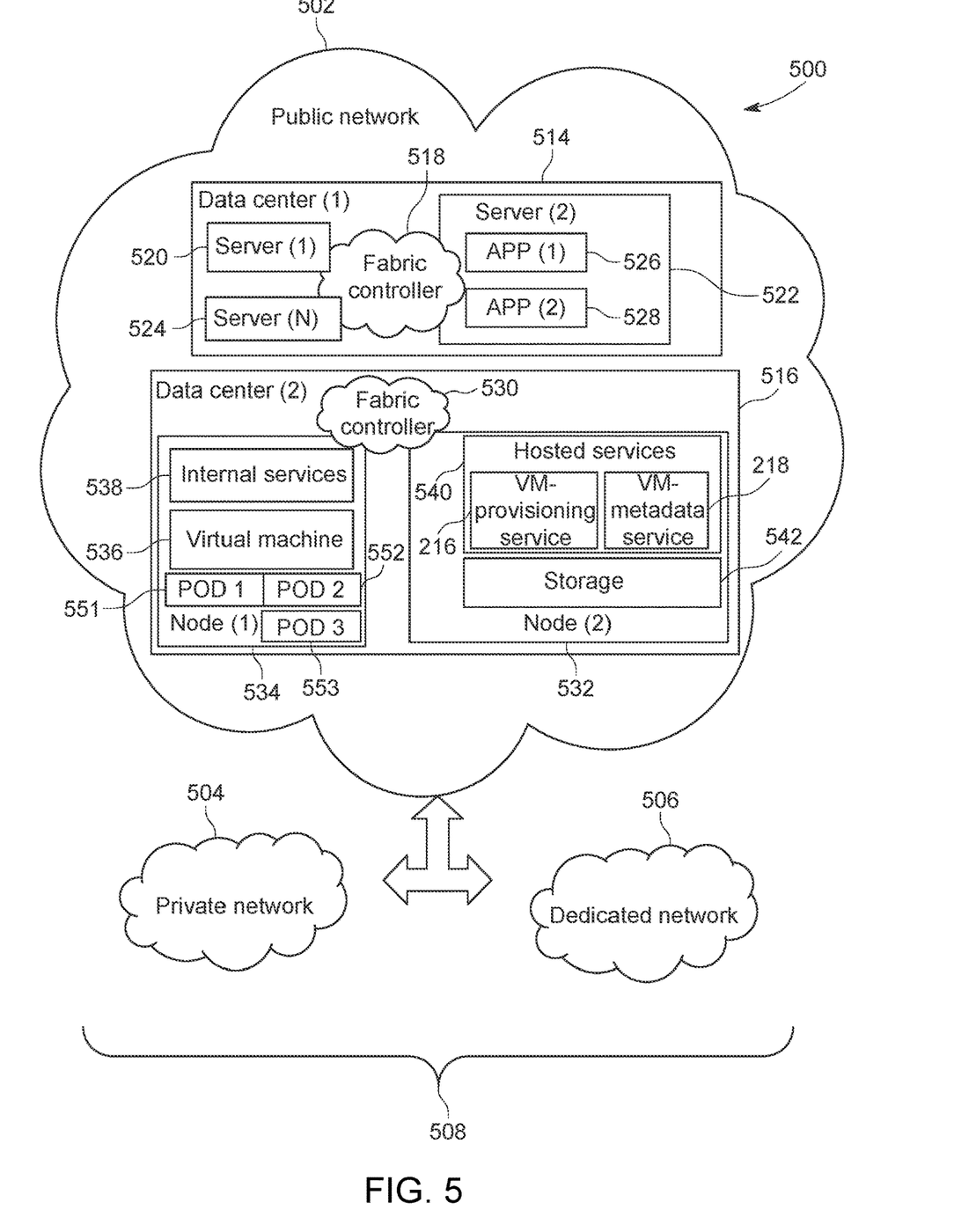
FIG. 5 illustrates a block diagram of an example cloud-computing environment according to various examples of the present disclosure.

FIG. 5 illustrates a block diagram of one example of a cloud-computing environment 500 in accordance with some of the disclosed implementations and examples. The cloud-computing environment 500 includes a public network 502, a private network 504, and a dedicated network 506. Public network 502 may be a public cloud-based network of computing resources, for example. Private network 504 may be a private enterprise network or private cloud-based network of computing resources. Dedicated network 506 may be a third-party network or dedicated cloud-based network of computing resources.

Hybrid cloud 508 may include any combination of public network 502, private network 504, and dedicated network 506. For example, dedicated network 506 may be optional, with hybrid cloud 508 comprised of public network 502 and private network 504.

Public network 502 may include data centers configured to host and support operations, including tasks of a distributed application, according to the fabric controller 518. It will be understood and appreciated that data center 514 and data center 516 shown in FIG. 5 are merely examples of suitable implementations for accommodating one or more distributed applications, and are not intended to suggest any limitation as to the scope of use or functionality of examples disclosed herein. Neither should data center 514 and data center 516 be interpreted as having any dependency or requirement related to any single resource, combination of resources, combination of servers (e.g., servers 520 and 524) combination of nodes (e.g., nodes 532 and 534), or a set of application programming interfaces (APIs) to access the resources, servers, and/or nodes.

Data center 514 illustrates a data center comprising a plurality of servers, such as servers 520 and 524. A fabric controller 518 is responsible for automatically managing the servers 520 and 524 and distributing tasks and other resources within the data center 514. By way of example, the fabric controller 518 may rely on a service model (e.g., designed by a customer that owns the distributed application) to provide guidance on how, where, and when to configure server 522 and how, where, and when to place application 526 and application 528 thereon. One or more role instances of a distributed application may be placed on one or more of the servers 520 and 524 of data center 514, where the one or more role instances may represent the portions of software, component programs, or instances of roles that participate in the distributed application. In other examples, one or more of the role instances may represent stored data that are accessible to the distributed application.

Data center 516 illustrates a data center comprising a plurality of nodes, such as node 532 and node 534. One or more virtual machines may run on nodes of data center 516, such as virtual machine (VM) 536 of node 534 for example. Although FIG. 5 depicts a single virtual node on a single node of data center 516, any number of virtual nodes may be implemented on any number of nodes of the data center in accordance with illustrative implementations and examples of the disclosure. Generally, virtual machine 536 is allocated to role instances of a distributed application, or service application, based on demands (e.g., amount of processing load) placed on the distributed application. As used herein, the phrase "virtual machine," or VM, is not meant to be limiting, and may refer to any software, application, operating system, or program that is executed by a processing unit to underlie the functionality of the role instances allocated thereto. Further, the VMs 536 may include processing capacity, storage locations, and other assets within the data center 516 to properly support the allocated role instances.

In operation, the virtual machines are dynamically assigned resources on a first node 534 and second node 532 of the data center, and endpoints (e.g., the role instances) are dynamically placed on the virtual machines to satisfy the current processing load. In one instance, a fabric controller 530 is responsible for automatically managing the virtual machines running on the nodes of data center 516 and for placing the role instances and other resources (e.g., software components) within the data center 516. By way of example, the fabric controller 530 may rely on a service model (e.g., designed by a customer that owns the service application) to provide guidance on how, where, and when to configure the virtual machines, such as VM 536, and how, where, and when to place the role instances thereon.

In some examples, one or more of the first node 534 and the second node 532 include pods as described herein. For example, as shown in FIG. 5, the first node 534 includes Pod 1 551, Pod 2 552, and Pod 3 553, which can be the pods dynamically relocated as described in greater detail above. For example, Pod 1 551 can be Pod 1 that has 44 MB of outgoing traffic to Pod 2, e.g., Pod 2 552, and 4 GB of outgoing traffic to Pod 3, Pod 3 553, presented in Table 1 above. As the pods are dynamically relocated to a selected node, e.g., the second node 532, the pods are terminated on the old node, e.g., the first node 534, as described in greater detail with reference to operations 307 to 311 in FIG. 3 above.

As described above, the virtual machines may be dynamically established and configured within one or more nodes of a data center. As illustrated herein, node 532 and node 534 may be any form of computing devices, such as, for example, a personal computer, a desktop computer, a laptop computer, a mobile device, a consumer electronic device, a server, and like. VMs machine(s) 536, while simultaneously hosting other virtual machines carved out for supporting other tenants of the data center 516, such as internal services 538, hosted services 540, and storage 542. Often, the role instances may include endpoints of distinct service applications owned by different customers.

In some implementations and examples, the hosted services 540 include a VM-provisioning service 216 and a VM-metadata service 218. These services operate to create, maintain, and query a code database, which may be stored and hosted in the public network 502, the private network 504, or the dedicated network 506, as well as any combination thereof.

Typically, each of the nodes include, or is linked to, some form of a computing unit (e.g., CPU, GPU, ASIC, etc.) to support operations of the component(s) running thereon. As utilized herein, the phrase "computing unit" generally refers to a dedicated computing device with processing power and storage memory, which supports operating software that underlies the execution of software, applications, and computer programs thereon. In one instance, the computing unit is configured with tangible hardware elements, or machines, that are integral, or operably coupled, to the nodes to enable each device to perform a variety of processes and operations. In another instance, the computing unit may encompass a processor, such as the processor 114, coupled to the computer-readable medium (e.g., the memory 112) accommodated by each of the nodes.

The role of instances that reside on the nodes may be to support operation of service applications, and thus they may be interconnected via APIs. In one instance, one or more of these interconnections may be established via a network cloud, such as public network 502. The network cloud serves to interconnect resources, such as the role instances, which may be distributed across various physical hosts, such as nodes 532 and 534. In addition, the network cloud facilitates communication over channels connecting the role instances of the service applications running in the data center 516. By way of example, the network cloud may include, without limitation, one or more communication networks, such as LANs and/or wide area networks WANs. Such communication networks are commonplace in offices, enterprise-wide computer networks, intranets, and the Internet, and therefore need not be discussed at length herein.

Additional Examples

Some examples herein are directed to a method of dynamically relocating pods, as shown by the flow chart 400. The method comprises receiving and storing inter-pod traffic data for a plurality of pods, wherein the plurality of pods includes a first pod, a second pod, and a third pod, and wherein the inter-pod traffic data includes traffic data sent from the first pod to the second pod and the third pod, from the second pod to the first pod and the third pod, and from the third pod to the first pod and the second pod (401), receiving and storing node resource availability data for each node of a plurality of nodes (403), generating a queue that sorts the plurality of pods by an amount of inter-pod traffic indicated by the inter-pod traffic data (405), generating a hash that maps one or more parameters to the plurality of nodes (407), selecting, based on the generated hash, a node of the plurality of nodes (409), and dynamically relocating a highest ranked pod of the plurality of pods from the generated queue to the selected node (411). Such a method decreases network latency due to decreasing the number of hops for the majority of network traffic, increases cluster scalability due to freeing of ports on a host, and reduces downtime when pods are relocated to optimize pod placement.

In some examples, the method further includes calculating resource usage for each of the first pod (551), the second pod (552), and the third pod (553). Calculating resource usage for the pods provides a mechanism to ensure that the usage of resources of the nodes are optimized.

In some examples, the receiving and storing inter-pod traffic data and the receiving and storing node resource availability data are performed at an interval based on a reevaluation time parameter. Performing operations at the interval based on the reevaluation time parameter ensures accurate traffic data and resource availability data is accurate to optimize inter-pod networking efficiency.

In some examples, the one or more parameters include a CPU measurement interval, a memory measurement interval, a disk measurement interval, and a network measurement interval. The one or more parameters are resources that provide measurement intervals at which to measure the resource usage for each of the first pod (551), the second pod (552), and the third pod (553) and resource availability for each node (534, 532). In some examples, the one or more parameters further include a percentage optimized parameter applied to a sum of inter-pod network usage of the pods of the plurality of pods that have been relocated. Accordingly, the physical capacity and limitations of the computing device 100 are optimized to ensure the computing device 100 is not overloaded by relocating one or more of the pods to a separate node.

In some examples, the method further includes generating a pod set identified for relocation, the pod set including at least one of the first pod (551), the second pod (552), and the third pod (553), identifying the node (532) of the plurality of nodes based on the one or more parameters being breached, and selecting the identified node (532) of the plurality of nodes for relocation of the pod set. Generating a pod set that includes selected pods for relocation further optimizes the dynamic pod relocation by grouping together pods for relocation instead of identifying each pod individually and allowing parameter values to be more accurately calculated.

In some examples, the method further includes confirming relocating the pod set to the selected node (532) maintains a usage value for each parameter of the one or more parameters below a maximum threshold. Confirming the values of each parameter ensures that the maximum threshold of each parameter will not be exceeded by relocating the pod or pods to the particular selected node.

Still other examples are directed to one or more servers (100) configured to dynamically relocate pods. The one or more servers (100) comprise a memory (112) that stores received inter-pod traffic data for a plurality of pods (551, 552, 553), wherein the plurality of pods includes a first pod (551), a second pod (552), and a third pod (553), and wherein the inter-pod traffic data includes traffic data sent from the first pod (551) to the second pod (552) and the third pod (553), from the second pod (552) to the first pod (551) and the third pod (553), and from the third pod (553) to the first pod (551) and the second pod (552). The memory (112) further stores received node resource availability data for each node (532, 534) of a plurality of nodes. The one or more servers (100) further comprise a processor (114) that generates a queue that sorts the plurality of pods by an amount of inter-pod traffic indicated by the inter-pod traffic data (405), generates a hash that maps one or more parameters to the plurality of nodes (407), selects, based on the generated hash, a node (532) of the plurality of nodes (532, 534) (409), generates a pod set, from the generated queue, identified for relocation, the pod set including at least one pod of the first pod (551), the second pod (552), and the third pod (553), and dynamically relocates the pod set to the selected node of the plurality of nodes (411). The one or more servers 100 operate to decrease network latency due to decreasing the number of hops, increase cluster scalability due to freeing of ports on a host, and reduce downtime when pods are relocated to optimize pod placement.

Still other examples are directed to one or more computer-storage memory (112) devices embodied with executable operations that, when executed by one or more processors (114), are configured to perform operations for receiving and storing inter-pod traffic data for a plurality of pods (551, 552, 553), wherein the plurality of pods includes a first pod (551), a second pod (552), and a third pod (553), and wherein the inter-pod traffic data includes traffic data sent from the first pod (551) to the second pod (552) and the third pod (553), from the second pod (552) to the first pod (551) and the third pod (553), and from the third pod (553) to the first pod (551) and the second pod (552), receiving and storing node resource availability data for each node (532, 534) of a plurality of nodes (403), generating a queue that sorts the plurality of pods by an amount of inter-pod traffic indicated by the inter-pod traffic data (405), generating a hash that maps one or more parameters to the plurality of nodes (407), selecting, based on the generated hash, a node of the plurality of nodes (409), and dynamically relocating a highest ranked pod of the plurality of pods from the generated queue to the selected node (411). Such a method decreases network latency due to decreasing the number of hops, increases cluster scalability due to freeing of ports on a host, and reduces downtime when pods are relocated to optimize pod placement.

Although described in connection with an example computing device 100, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one example or may relate to several examples. The examples are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A computer-implemented method, the method comprising:
   receiving and storing inter-pod traffic data for a plurality of pods, wherein the plurality of pods includes a first pod, a second pod, and a third pod, and wherein the inter-pod traffic data includes traffic data sent from the first pod to the second pod and the third pod, from the second pod to the first pod and the third pod, and from the third pod to the first pod and the second pod;
   receiving and storing node resource availability data for each node of a plurality of nodes;
   generating a queue that sorts the plurality of pods by an amount of inter-pod traffic indicated by the inter-pod traffic data;
   generating a hash that maps one or more parameters to the plurality of nodes;
   selecting, based on the generated hash, a node of the plurality of nodes; and
   dynamically relocating a highest ranked pod of the plurality of pods from the generated queue to the selected node of the plurality of nodes.

2. The computer-implemented method of claim 1, further comprising calculating resource usage for each of the first pod, the second pod, and the third pod.

3. The computer-implemented method of claim 1, wherein the receiving and storing inter-pod traffic data and the receiving and storing node resource availability data are performed at an interval based on a reevaluation time parameter.

4. The computer-implemented method of claim 1, wherein the one or more parameters include a CPU measurement interval, a memory measurement interval, a disk measurement interval, and a network measurement interval.

5. The computer-implemented method of claim 4, wherein the one or more parameters further include a percentage optimized parameter applied to a sum of inter-pod network usage of the pods of the plurality of pods that have been relocated.

6. The computer-implemented method of claim 1, wherein selecting the node comprises:
   generating a pod set identified for relocation, the pod set including at least one of the first pod, the second pod, or the third pod;
   identifying the node of the plurality of nodes based on the one or more parameters being breached; and
   selecting the identified node of the plurality of nodes for relocation of the pod set.

7. The computer-implemented method of claim 6, wherein selecting the node of the plurality of nodes for relocation of the pod set includes confirming relocating the pod set to the selected node maintains a usage value for each parameter of the one or more parameters below a maximum threshold.

8. The computer-implemented method of claim 1, wherein a value for each parameter of the one or more parameters is set by a user.

9. One or more servers configured to dynamically relocate pods, the one or more servers comprising:
   a memory configured to:
      store received inter-pod traffic data for a plurality of pods, wherein the plurality of pods includes a first pod, a second pod, and a third pod, and wherein the inter-pod traffic data includes traffic data sent from the first pod to the second pod and the third pod, from the second pod to the first pod and the third pod, and from the third pod to the first pod and the second pod, and
      store received node resource availability data for each node of a plurality of nodes; and
   a processor configured to:
      generate a queue that sorts the plurality of pods by an amount of inter-pod traffic indicated by the inter-pod traffic data;
      generate a hash that maps one or more parameters to the plurality of nodes;
      select, based on the generated hash, a node of the plurality of nodes;
      generate a pod set, from the generated queue, identified for relocation, the pod set including at least one pod of the first pod, the second pod, or the third pod; and
      dynamically relocating the pod set to the selected node of the plurality of nodes.

10. The one or more servers of claim 9, wherein the processor is further configured to calculate resource usage for each of the first pod, the second pod, and the third pod.

11. The one or more servers of claim 9, wherein the processor is further configured to store the received inter-pod traffic data and the node resource availability data at an interval based on a reevaluation time parameter.

12. The one or more servers of claim 9, wherein the one or more parameters include a CPU measurement interval, a memory measurement interval, a disk measurement interval, and a network measurement interval.

13. The one or more servers of claim 12, wherein the one or more parameters further include a percentage optimized parameter applied to a sum of inter-pod network usage of the pods of the plurality of pods that have been relocated.

14. The one or more servers of claim 9, wherein, to select the node of the plurality of nodes for relocation of the pod set, the processor is further configured to:
   identify the node of the plurality of nodes based on the one or more parameters being breached;
   select the identified node of the plurality of nodes for relocation of the pod set; and
   confirm relocating the pod set to the node maintains a usage value for each parameter of the one or more parameters below a maximum threshold.

15. One or more computer-storage memory devices embodied with executable operations to dynamically relocate pods that, when executed by a processor, cause the processor to:

receive and store inter-pod traffic data for a plurality of pods, wherein the plurality of pods includes a first pod, a second pod, and a third pod, and wherein the inter-pod traffic data includes traffic data sent from the first pod to the second pod and the third pod, from the second pod to the first pod and the third pod, and from the third pod to the first pod and the second pod;

receive and store node resource availability data for each node of a plurality of nodes;

generate a queue that sorts the plurality of pods by an amount of inter-pod traffic indicated by the inter-pod traffic data;

generate a hash that maps one or more parameters to the plurality of nodes;

select, based on the generated hash, a node of the plurality of nodes; and dynamically relocate a highest ranked pod of the plurality of pods from the generated queue to the selected node of the plurality of nodes.

16. The one or more computer-storage memory devices of claim 15, embodied with further operations that, when executed by the processor, cause the processor to calculate resource usage for each of the first pod, the second pod, and the third pod.

17. The one or more computer-storage memory devices of claim 15, wherein the inter-pod traffic data and the node resource availability data are received and stored at an interval based on a reevaluation time parameter.

18. The one or more computer-storage memory devices of claim 15, wherein the one or more parameters include a CPU measurement interval, a memory measurement interval, a disk measurement interval, and a network measurement interval.

19. The one or more computer-storage memory devices of claim 18, wherein the one or more parameters further include a percentage optimized parameter applied to a sum of inter-pod network usage of the pods of the plurality of pods that have been relocated.

20. The one or more computer-storage memory devices of claim 15, embodied with further operations that, when executed by the processor, cause the processor to:

generate a pod set identified for relocation, the pod set including at least one of the first pod, the second pod, or the third pod;

identify the node of the plurality of nodes based on the one or more parameters being breached;

select the identified node of the plurality of nodes for relocation of the pod set; and confirm relocating the pod set to the selected node maintains a usage value for each parameter of the one or more parameters below a maximum threshold.

\* \* \* \* \*